US011618959B2

United States Patent
Takenouchi et al.

(10) Patent No.: US 11,618,959 B2
(45) Date of Patent: Apr. 4, 2023

(54) METHOD FOR TREATING LITHIUM ION BATTERY WASTE

(71) Applicant: SUMITOMO METAL MINING CO., LTD., Tokyo (JP)

(72) Inventors: Hiroshi Takenouchi, Niihama (JP); Satoshi Asano, Niihama (JP); Toshirou Tan, Niihama (JP); Hiroshi Kobayashi, Niihama (JP); Kenji Takeda, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 434 days.

(21) Appl. No.: 16/765,225

(22) PCT Filed: Oct. 22, 2018

(86) PCT No.: PCT/JP2018/039199
§ 371 (c)(1),
(2) Date: May 19, 2020

(87) PCT Pub. No.: WO2019/102765
PCT Pub. Date: May 31, 2019

(65) Prior Publication Data
US 2020/0277704 A1    Sep. 3, 2020

(30) Foreign Application Priority Data

Nov. 24, 2017  (JP) .............................. JP2017-225797
Dec. 19, 2017  (JP) .............................. JP2017-242907

(51) Int. Cl.
*C25C 1/12*    (2006.01)
*H01M 10/54*    (2006.01)
(Continued)

(52) U.S. Cl.
CPC .................. *C25C 1/12* (2013.01); *B09B 3/40* (2022.01); *H01M 10/0525* (2013.01); *H01M 10/54* (2013.01)

(58) Field of Classification Search
CPC ....................................................... C25C 1/12
See application file for complete search history.

(56) References Cited

U.S. PATENT DOCUMENTS 669,442 A * 3/1901 Frasch ...................... C25C 1/12
                                                      204/257
2,888,390 A * 5/1959 Lapee ...................... C25C 1/12
                                                      205/575

(Continued)

FOREIGN PATENT DOCUMENTS

CN          103628088 A    3/2014
CN          104611566 A    5/2015
(Continued)

OTHER PUBLICATIONS

International Search Report dated Dec. 25, 2018, issued for PCT/JP2018/039199.
(Continued)

Primary Examiner — Harry D Wilkins, III
(74) Attorney, Agent, or Firm — Locke Lord LLP; James E. Armstrong, IV; Nicholas J. DiCeglie, Jr.

(57) ABSTRACT

Provided is a treatment method whereby it becomes possible to recovery copper, nickel and cobalt, which are valuable metals, contained in a lithium ion battery waste and to separate copper, nickel and cobalt from one another effectively. A method for treating a lithium ion battery waste according to the present invention includes: an alloy production step S1 of introducing the lithium ion battery waste into a furnace and then melting the lithium ion battery waste by heating, thereby producing an alloy containing copper, nickel and cobalt; and an electrolytic purification step S2 of (Continued)

subjecting the alloy to such an electrolytic treatment that the alloy is charged as an anode into a sulfuric acid solution and then electricity is conducted between the anode and a cathode to electrodeposit copper contained in the alloy onto the cathode, thereby separating nickel and cobalt from each other.

20 Claims, 1 Drawing Sheet

(51) Int. Cl.
*B09B 3/40* (2022.01)
*H01M 10/0525* (2010.01)

(56) References Cited

U.S. PATENT DOCUMENTS

| | | | | |
|---|---|---|---|---|
| 4,140,596 | A | * | 2/1979 | Wobking ............ C25C 1/00 204/DIG. 9 |
| 6,440,194 | B1 | * | 8/2002 | Krofchak ............ C22B 7/04 423/43 |
| 6,514,311 | B1 | | 2/2003 | Lin et al. |
| 7,169,206 | B2 | | 1/2007 | Cheret et al. |
| 2009/0272466 | A1 | * | 11/2009 | Shindo ............ C22B 15/0089 205/98 |

FOREIGN PATENT DOCUMENTS

| | | | |
|---|---|---|---|
| CN | 105063349 A | | 11/2015 |
| CN | 107012332 A | | 8/2017 |
| EP | 0068469 A2 | * | 1/1983 ............ C25C 1/12 |
| EP | 3715485 A1 | | 9/2020 |
| JP | 2003-157913 A | | 5/2003 |
| JP | 2012-001750 A | | 1/2012 |
| JP | 2013-091826 A | | 5/2013 |
| JP | 2017-036489 A | | 2/2017 |

OTHER PUBLICATIONS

Office Action issued in the CN Patent Application No. 201880075458. X, dated May 8, 2021.

* cited by examiner

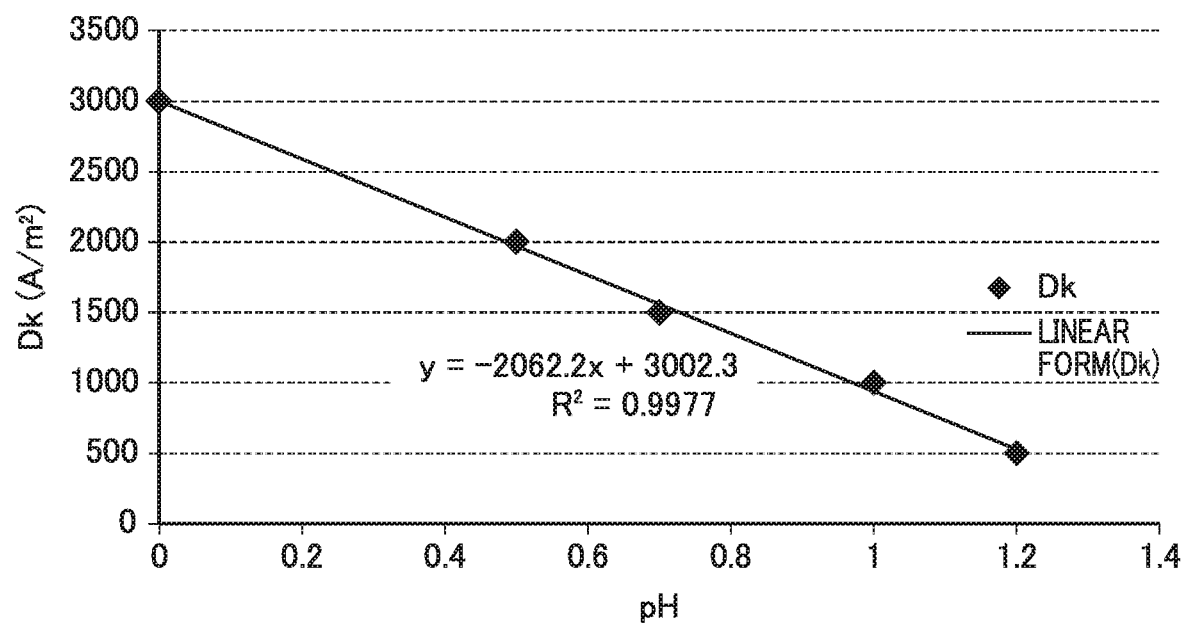

METHOD FOR TREATING LITHIUM ION BATTERY WASTE

TECHNICAL FIELD

The present invention relates to a method for treating a lithium ion battery waste, and more specifically, to a treatment method for separating copper, nickel and cobalt contained in a lithium ion battery waste from one another and recovering copper, nickel and cobalt.

BACKGROUND ART

Lithium ion batteries, which cannot be used because of a lifetime expiration of the batteries, or defective members and the like generated in a manufacturing process of lithium ion batteries (hereinafter, collectively referred to as "lithium ion battery waste") are expected to be further increased while the use application of lithium ion batteries is expanded and the number of batteries manufactured is increased. Such a lithium ion battery waste contains a large amount of valuable metals such as copper, nickel, and cobalt, and it is desired that the lithium ion battery waste is not buried and discarded as it is as an industrial waste but those valuable metals are recovered and recycled.

However, in the lithium ion battery waste, other than the above valuable metals, various materials, which include metals such as iron and aluminum which are not particularly economical even if they are recovered with taking time and effort, substances such as plastic components which are difficult to recover as they are, substances such as organic electrolyte solutions containing phosphorus or fluorine which are not technically easy to recover and cannot be discarded as they are in terms of environment aspect, and the like, are used. Therefore, it is not easy to efficiently separate those substances and to recover valuable metals.

Further, an organic electrolyte solution to be used in lithium ion batteries has a high degree of activity, and at the time of use as batteries, the organic electrolyte solution may be in a state where a charged load remains. For this reason, when the lithium ion battery waste is disassembled carelessly, a positive electrode and a negative electrode of the battery are shorted out, and there is a concern of heat generation, ignition of the electrolyte solution, or the like. As described above, in the treatment of the lithium ion battery waste, a problem also arises in that it takes caution, and time and effort for handling the lithium ion battery waste.

For this reason, when the lithium ion battery waste is treated to recover valuable metals, first, a treatment of putting the lithium ion battery waste into a furnace and melting the lithium ion battery waste at a high temperature at once is performed, or in the case of treating a large amount of lithium ion battery waste, a detoxifying treatment of heating (roasting) the lithium ion battery waste at a temperature of about 400° C. to 600° C. necessary for decomposing an electrolyte solution to remove a load remaining in the battery and to decompose the organic electrolyte solution is performed as a pretreatment. Next, a method for performing a two-stage melting step in which the lithium ion battery waste obtained after finishing the detoxifying treatment is put into an electric furnace or the like and heated to a higher temperature, and subjected to a dry treatment of melting valuable metals to distribute most of iron or aluminum in slag and separate the slag, thereby obtaining an alloy metal containing copper, nickel, and cobalt as main components, has been performed.

The alloy metal obtained by such a conventional method can be reused as ferronickel that becomes a raw material for stainless steel, but valuable components such as cobalt and copper other than nickel contained in the alloy metal become useless as a raw material for stainless steel and cannot be effectively recovered, which results in resource wasting.

Therefore, in a case where copper and cobalt are also tried to be effectively recovered, it is necessary to dissolve the obtained alloy metal once with an acid or the like and then to perform separation and purification.

However, since copper contained in the lithium ion battery waste is used as an electrode or a wiring material, the content of copper is generally larger than the content of nickel, and for example, a process of a method for smelting nickel from nickel oxide ore (smelting method of nickel oxide ore) cannot be used without any changes.

As a method for separating copper, nickel and cobalt from one another by leaching an alloy metal with an acid, for example, a method disclosed in Patent Document 1 is mentioned. This method is a method in which, while valuable metals such as nickel and cobalt are dissolved in a leachate in a step of leaching an alloy with an acid, by causing most of copper to remain in a solid state, a treatment necessary for removing copper dissolved in the leached solution is simplified or omitted to improve the treatment efficiency and the treatment cost can be reduced.

Specifically, the method is a method including: a heating step of heating a lithium ion battery to 450° C. to 650° C.; and a leaching step of leaching battery powder obtained after the heating step with a leachate, which contains 0.9 times molar equivalent to 1.5 times molar equivalent of sulfuric acid necessary for dissolving all metal components contained in the battery powder, and terminating the leaching before an oxidation-reduction potential (ORP) of the leachate simultaneously measured exceeds 0 mV in terms of a value obtained by using a silver/silver chloride electrode as a reference electrode.

The method disclosed in Patent Document 1, that is, a so-called selective leaching method has an advantage in that a treatment can be efficiently performed. However, when the alloy is tried to be leached with an acid, it is necessary to use gas such as oxygen or air or an oxidizing agent such as hydrogen peroxide in many cases. Further, a problem arises in that time and effort in terms of facilities or operations such as heating of an acid solution to increase a temperature are required.

As described above, it has not been easy to separate copper, nickel and cobalt from one another by efficiently dissolving an alloy containing copper, nickel and cobalt with an acid.

Patent Document 1: Japanese Unexamined Patent Application, Publication No. 2017-36489

DISCLOSURE OF THE INVENTION

Problems to be Solved by the Invention

The present invention has been proposed in view of such circumstances, and an object thereof is to provide a method whereby it becomes possible to recovery copper, nickel and cobalt, which are valuable metals, from a lithium ion battery waste and to separate copper, nickel and cobalt from one another effectively.

Means for Solving the Problems

The present inventor has conducted intensive studies, and as a result, found that the aforementioned problems can be solved effectively by melting a lithium ion battery waste to obtain an alloy containing copper, nickel and cobalt and performing an electrolytic treatment by using the alloy as an anode in a sulfuric acid solution, thereby completing the present invention.

(1) A first invention of the present invention is a method for treating a lithium ion battery waste, the method including an alloy production step of introducing the lithium ion battery waste into a furnace and then melting the lithium ion battery waste by heating, thereby producing an alloy containing copper, nickel and cobalt, and an electrolytic purification step of subjecting the alloy to such an electrolytic treatment that the alloy is charged as an anode into a sulfuric acid solution and then electricity is conducted between the anode and a cathode to electrodeposit copper contained in the alloy onto the cathode, thereby separating copper from nickel and cobalt.

(2) A second invention of the present invention is the method for treating a lithium ion battery waste in the first invention, in which in the electrolytic purification step, a current density of the anode is set in a range of 3 $A/m^2$ or more and 3000 $A/m^2$ or less.

(3) A third invention of the present invention is the method for treating a lithium ion battery waste in the first or second invention, in which in the electrolytic purification step, the electrolytic treatment is performed while a copper concentration in the sulfuric acid solution that is an electrolyte solution is maintained in a range of 5 g/L or more and 50 g/L or less.

(4) A fourth invention of the present invention is the method for treating a lithium ion battery waste in any one of the first to third inventions, in which the alloy contains phosphorus in a range of 0.5 wt % or more and 2.0 wt % or less, and the alloy is used as an anode in the electrolytic purification.

(5) A fifth invention of the present invention is the method for treating a lithium ion battery waste in any one of the first to fourth inventions, further including an electrowinning step of supplying an electrolyte solution obtained after the electrolytic treatment in the electrolytic purification step to an electrolysis tank and electrodepositing copper remaining the electrolyte solution by using an insoluble anode.

(6) A sixth invention of the present invention is the method for treating a lithium ion battery waste in the fifth invention, in which the electrolyte solution obtained through the electrowinning step and discharged from the electrolysis tank is repeatedly supplied as the electrolyte solution to be used in the electrolytic purification step.

(7) A seventh invention of the present invention is the method for treating a lithium ion battery waste in the first invention, further including an impurity removing step of removing an impurity component by recovering at least a part of an electrolyte solution obtained after the electrolytic treatment in the electrolytic purification step and adding an oxidizing agent and a neutralizing agent to the electrolyte solution to adjust an oxidation-reduction potential (reference electrode: silver/silver chloride electrode) to 570 mV or more and to adjust a pH in a range of 3 or more and 5 or less, in which after the impurity removing step, sulfuric acid is added to a filtrate obtained by solid-liquid separation to adjust the pH to 1.5 or less, and the pH-adjusted filtrate is repeatedly supplied as the electrolyte solution to be used in the electrolytic purification step.

(8) An eighth invention of the present invention is the method for treating a lithium ion battery waste in the first invention, further including an impurity removing step of removing an impurity component by recovering at least a part of an electrolyte solution obtained after the electrolytic treatment in the electrolytic purification step, adding an oxidizing agent to the electrolyte solution at a stage in which a pH of the electrolyte solution is 1.5 or less to adjust an oxidation-reduction potential (reference electrode: silver/silver chloride electrode) to 570 mV or more, and then further adding an oxidizing agent and a neutralizing agent to increase the pH to 3 and to adjust the oxidation-reduction potential to 300 mV or more, in which after the impurity removing step, sulfuric acid is added to a filtrate obtained by solid-liquid separation to adjust the pH to 1.5 or less, and the pH-adjusted filtrate is repeatedly supplied as the electrolyte solution to be used in the electrolytic purification step.

Effects of the Invention

With the method according to the present invention, it becomes possible to recovery copper, nickel and cobalt, which are valuable metals, from a lithium ion battery waste and to separate copper, nickel and cobalt thus recovered from one another effectively.

BRIEF DESCRIPTION OF THE DRAWINGS

FIG. 1 is a graph showing a relation between a pH of an electrolyte solution in which a nickel grade in copper to be electrodeposited to a cathode is 0.1 wt % or less and a cathode current density.

PREFERRED MODE FOR CARRYING OUT THE INVENTION

Hereinafter, specific embodiments of the present invention will be described in detail. Incidentally, the present invention is not limited to the following embodiments, and various modifications are possible without changing the gist of the present invention. In addition, in the present specification, "X to Y" (X and Y are arbitrary numerical values) means "X or more and Y or less."

A method for treating a lithium ion battery waste according to the present invention (hereinafter, also simply referred to as "treatment method") is a treatment method for recovering copper, nickel and cobalt, which are valuable metals, from a lithium ion battery waste such as a used battery. Herein, the lithium ion battery waste is a generic term of the used lithium ion battery as described above and scraps such as waste materials generated in a manufacturing process of lithium ion batteries.

Specifically, the method for treating a lithium ion battery waste according to the present invention includes an alloy production step S1 of introducing the lithium ion battery waste into a furnace and then melting the lithium ion battery waste by heating, thereby producing an alloy containing copper, nickel and cobalt, and an electrolytic purification step S2 of subjecting the obtained alloy to such an electrolytic treatment that the alloy is charged as an anode into a sulfuric acid solution and then electricity is conducted between the anode and a cathode to electrodeposit copper contained in the alloy onto the cathode, thereby separating copper from nickel and cobalt.

As described above, the treatment method according to the present invention uses, for example, an electrolytic method when a lithium ion battery waste roasted by a dry method is melted to obtain an alloy (alloy metal) and then the obtained alloy is dissolved. That is, by not directly dissolving the obtained alloy with an acid or the like but by conducting electricity using the alloy as an anode to perform the electrolytic treatment, copper, nickel and cobalt are eluted from the alloy in the electrolyte solution. In addition, simultaneously, at the cathode side, copper in the electrolyte solution is electrodeposited onto the cathode.

According to such a treatment method, it is possible to efficiently separate copper of the solid substance obtained by electrodeposition from the solution in which nickel and cobalt are eluted. Since nickel and cobalt can be used, for example, as a material for an active material of a battery, according to such a treatment method, the solution containing nickel and cobalt recovered in a state of being separated from copper from a lithium ion battery waste can be used without any changes as a raw material for producing an active material.

[Alloy Production Step]

In the alloy production step S1, the lithium ion battery waste is introduced into a furnace and then melted the lithium ion battery waste by heating, thereby producing an alloy containing copper, nickel and cobalt. That is, the alloy production step is a step of producing an alloy containing copper, nickel and cobalt, which are valuable metals, contained in the lithium ion battery waste.

In the alloy production step S1, first, such a treatment that a lithium ion battery waste is introduced into a roasting furnace and roasted at a temperature, for example, 300° C. to 1000° C., more preferably 500° C. to 900° C. By performing such a roasting treatment, the electrolyte solution contained in the lithium ion battery waste can be decomposed and volatilized to be removed. Further, also regarding a structure including a casing body which is included in the lithium ion battery waste, separation and removal can be easily performed by controlling a roasting temperature on the basis of a melting point of a material constituting the structure.

In the alloy production step S1, next, the roasted material (roasted product) obtained after the roasting treatment is introduced into a melting furnace such as a crucible made of graphite or a crucible made of magnesium and melted, for example, under a high-temperature condition of about 1100° C. to 1400° C. By such a melting step, the roasted material can be almost completely melted and an alloy containing copper, nickel and cobalt can be produced.

In the melting step in a melting furnace, the roasted material can be treated, for example, with an oxide-based flux being introduced together. The flux is not particularly limited, and examples thereof include calcium oxide, magnesium oxide, and silicon oxide.

Herein, iron may be contained in the alloy obtained by the melting step.

Further, in a lithium ion battery, an electrolyte solution containing phosphorus in addition to fluorine such as hexafluorophosphate may be used, and in particular, fluorine is easily volatilized and removed by the roasting treatment, but some of phosphorus may be distributed in the alloy. For this reason, in the alloy obtained by the melting step, some of phosphorus may be contained and is alloyed with copper to be present as phosphorus-containing copper or in the form similar thereto. However, in the case of the alloy containing phosphorus in this way, when the alloy is used as an anode in the electrolytic treatment, the passivation of the anode can be less likely to occur, and the electrolytic treatment is performed at a high current density so that the alloy can be dissolved in the electrolyte solution.

[Electrolytic Purification Step]

In the electrolytic purification step S2, the obtained alloy (alloy containing copper, nickel and cobalt) is charged as an anode into a sulfuric acid solution and the electrolytic treatment is performed.

Specifically, the alloy containing copper, nickel and cobalt is used as an anode, a stainless steel or titanium plate, or the like is used as a cathode, and the alloy is charged into the electrolysis tank such that the anode and the cathode face each other. Then, the electricity is conducted between the anode and the cathode so as to perform the electrolytic treatment.

By performing such an electrolytic treatment, copper, nickel and cobalt are eluted in the electrolyte solution from the alloy constituting the anode, and then, copper, which is a noble metal, is preferentially precipitated (electrodeposited) onto the cathode. According to this, nickel and cobalt remaining in the electrolyte solution without being electrodeposited to the cathode can be effectively separated from copper. Incidentally, also in a case where iron is contained in the alloy constituting the anode, iron eluted in the electrolyte solution remains similarly to the case of nickel and cobalt and is effectively separated from copper.

Herein, a sulfuric acid solution is used as an electrolyte solution and the sulfuric acid concentration is not particularly limited, but for example, a solution having a concentration of 1 mass % to 70 mass % is preferably used. Incidentally, the sulfuric acid concentration of the electrolyte solution including the sulfuric acid solution refers to the sulfuric acid concentration of the initial electrolyte solution when electricity is conducted.

When the sulfuric acid concentration in the electrolyte solution is less than 1 mass %, the concentration of each of copper, nickel and cobalt that can be dissolved is not increased, so that productivity may be degraded. Further, in an electrolyte solution having a low sulfuric acid concentration, electrical conductivity is decreased, which leads to a loss. Furthermore, if the concentration of copper that can be dissolved is not increased, electrodeposition of copper onto the cathode is not smooth and is easily to form a powder shape or a granular shape, and nickel and cobalt get into a gap of electrodeposition to lead to a decrease in separation property, etc., which is not preferable.

On the other hand, when the sulfuric acid concentration in the electrolyte solution is more than 70 mass %, there is no economic advantage, and when the electrolyte solution has an excessively high concentration, passivation by which the dissolution of metals from the anode is suppressed is likely to occur. Further, the re-dissolution of copper electrodeposited onto the cathode after being dissolving in the electrolyte solution is likely to occur. Furthermore, it is necessary to use facilities such as a pipe or an electrolysis tank having durability with respect to the electrolyte solution containing a high-concentration sulfuric acid, and this is likely to lead to an increase in cost or a decrease in productivity.

Further, it is preferable that the electrolyte solution is subjected to the electrolytic treatment while the pH thereof is adjusted in a range of 0 or more and 1.5 or less and maintained. According to this, it is possible to more efficiently dissolve copper, nickel and cobalt from the alloy, and thereafter, it is possible to more selectively electrodeposit only copper. When the pH of the electrolyte solution is less than 0, the acid is too strong, so that the electrodeposited copper may be likely to be re-dissolved. On the other hand, when the pH of the electrolyte solution is more than 1.5, not only copper but also nickel and cobalt may tend to be electrodeposited.

When the alloy containing copper, nickel and cobalt is used as an anode, the alloy is casted in a plate shape like an electrode plate. Then, cathode plates having the same size (a stainless steel plate and a titanium plate) are prepared, and the plates are charged into an electrolysis tank to face each other such than a distance between electrodes (distance between the planes) becomes, for example, 10 mm to 40 mm.

The current density of the anode is not particularly limited, but is set preferably in a range of 3 A/m$^2$ or more and 3000 A/m$^2$ or less and more preferably in a range of 100 A/m$^2$ or more and 2000 A/m$^2$ or less.

When the current density of the anode is less than 3 A/m$^2$, there is a possibility of degradation of production efficiency such as a need for an excessively large facility as much as insufficiency of the current density. On the other hand, when electricity is conducted such that the current density of the anode is more than 3000 A/m$^2$, passivation is likely to occur in the anode side, and since solution resistance due to the electrolyte solution between the anode and the cathode is increased, power costs in the entire process are increased so that efficient treatment cannot be performed. Further, heat generated by the electrolytic treatment is increased so that a problem may arise in terms of materials or in a safety aspect. Furthermore, components other than copper are likely to be electrodeposited onto the cathode, etc., which is not preferable.

Herein, it is preferable that the current density of the cathode is equal to or lower than the above range of the anode current density. By setting the current density of the cathode in this way, copper eluted from the anode can be more efficiently electrodeposited onto the cathode. In the treatment method according to the present invention, while copper eluted from the anode is electrodeposited to the cathode, nickel and cobalt remain to be dissolved, and copper is separated from nickel and cobalt. From this point, if copper is not efficiently electrodeposited, this leads to a loss also in terms of electrical power as much as insufficiency of copper being electrodeposited, which is not preferable.

In order to make the current density of the cathode lower than the current density of the anode, for example, a cathode having a structure in which the electrode area of the cathode is made to be larger than the electrode area of the anode may be used.

Further, the present inventor has found that in a range in which the pH of the electrolyte solution is 0 to 1.2, between the pH of the electrolyte solution from which an electrodeposit having a nickel grade of less than 0.1 wt % is obtainable and the cathode current density (Dk), the following relation is established:

$$Dk\ (A/m^2) = -2062 \times pH + 3002 \quad \text{(Equation 1)}$$

That is, by performing the electrolytic purification at a current density equal to or less than the current density calculated by the above Equation 1 with respect to a predetermined pH, the grade of nickel electrodeposited onto the cathode can be suppressed to be less than 0.1 wt %.

As described above, in the electrolytic treatment in the electrolytic purification step S2, copper, nickel, cobalt, iron, and the like are dissolved from the alloy used as an anode in the electrolyte solution, and then the dissolved copper is preferentially electrodeposited onto the cathode, but it is preferable that the copper concentration in the electrolyte solution at this time is adjusted to be maintained in a range of 5 g/L or more and 50 g/L or less.

When the concentration of copper dissolved in the electrolyte solution is less than 5 g/L, nickel and cobalt dissolved in the electrolyte solution are also much more likely to be electrodeposited onto the cathode, and thus there is a possibility that copper cannot be effectively separated. Further, in a state where copper ions are insufficient in the electrolyte solution, in the cathode, water is electrolyzed to generate hydrogen gas, and as a result, the pH of the electrolyte solution is increased so that a tendency that nickel and cobalt are electrodeposited may be promoted. On the other hand, in a state where the copper concentration in the electrolyte solution is more than 50 g/L, the copper concentration in the electrolyte solution becomes excessive, so that separation of copper from nickel and cobalt may be insufficient.

Further, as described above, phosphorus derived from the electrolyte solution of the lithium ion battery waste may be contained in the alloy obtained through the alloy production step S1. When the alloy containing phosphorus in this way is used as an anode, the passivation of the anode can be less likely to occur and the electrolytic treatment can be performed at a high current density. The concentration of phosphorus in the alloy is not particularly limited, but for example, is preferably in a range of 0.5 wt % or more and 2.0 wt % or less.

Phosphorus is considered to be present in the form of copper phosphide (CuP), nickel phosphide (NiP), or the like in the alloy serving as an anode, but as copper, nickel and cobalt are eluted from the alloy according to electrolysis, phosphorus is condensed in an adhered substance produced as slime on the anode surface. When the phosphorus concentration in the alloy is less than 0.5 wt %, it becomes difficult to obtain the effect of suppressing the passivation of the anode described above. On the other hand, when the phosphorus concentration is more than 2.0 wt %, time and effort for a slime treatment or time and effort for removing phosphorus partially dissolved in the electrolyte solution are increased. Further, when the electrolyte solution in which nickel and cobalt are leached by the electrolytic purification is further purified, time and effort for removing phosphorus as an impurity are increased.

Incidentally, the condensation of phosphorus into the anode slime tends to easily proceed as the acid concentration of the electrolyte solution is lower and the anode current density is smaller. Therefore, in a range of the acid concentration or a range of the anode current density which is preferable in the treatment in the electrolytic purification step S2 as described above, the whole amount of phosphorus in the alloy is not eluted in the electrolyte solution. Since the phosphorus eluted in the electrolyte solution needs to be separated and removed (separated and removed in an impurity removing step described below) from the electrolyte solution upon some of the electrolyte solution of the electrolytic purification step S2 is reused, taking into consideration of time and effort therefor, the proportion of phosphorus distributed in the anode slime is set to preferably 20% or more.

As described above, in the treatment method according to the present invention, the electrolytic treatment is performed using, as an anode, the alloy containing copper, nickel and cobalt which has been obtained in the alloy production step S1 and charging the alloy into the electrolyte solution of the sulfuric acid solution. Then, copper, nickel and cobalt contained in the alloy are dissolved in the electrolyte solution, only copper is preferentially precipitated on the cathode and recovered, and according to this, copper, nickel and cobalt are effectively and efficiently separated from one another.

According to such a method, by a simple method that is the electrolytic treatment, it is possible to effectively recover copper, nickel and cobalt, which are valuable metals, from the lithium ion battery waste, and it is possible to recover copper, nickel and cobalt in a state of being separated from one another.

Incidentally, in the case of using an alloy containing iron, iron also remains in the electrolyte solution along with nickel and cobalt as described above, but by subjecting a solution containing these nickel, cobalt, and iron (sulfuric acid solution) to a known purification treatment, respective metal components can be separated from one another with ease and with a high purity. For example, a purification method such as a solvent extraction treatment using an extracting agent that can selectively extract each metal can be applied.

Further, the eluted amount of the metal component eluted in the electrolyte solution by the electrolytic treatment can be controlled by the quantity of electricity conducted between the anode and the cathode. Further, by using the electrolytic treatment, since an oxidizing agent, air blowing, or the like is not necessary, power other than electrical power for electrolysis or power for blowing air is not necessary, environment deterioration that mist containing an acid is scattered on the periphery does not also occur, and a stable operation can be performed.

[Electrowinning Step]

Further, an electrowinning step S3 of supplying an electrolyte solution obtained after the electrolytic treatment in the electrolytic purification step S2 to an electrolysis tank to perform the electrolytic treatment and electrodepositing copper remaining the electrolyte solution can be included.

The amount of copper dissolved in the electrolyte solution varies depending on the amount of copper in the alloy, the quantity of electricity conducted in the electrolytic treatment in the electrolytic purification step S2, or the like, and the amount of copper electrodeposited onto the cathode also varies. When copper is contained in the electrolyte solution obtained through the electrolytic purification step S2, the separation property of copper from nickel and cobalt becomes insufficient. In this regard, the method includes the electrowinning step S3 of performing the electrolytic treatment using an electrolyte solution (an electrolyte solution in which copper remains) obtained after the electrolytic treatment in the electrolytic purification step S2, and according to this, the treatment of electrodepositing copper remaining in the electrolyte solution is performed.

Specifically, in the electrowinning step S3, an electrolyte solution obtained after the electrolytic treatment in the electrolytic purification step S2 is supplied to a predetermined electrolysis tank and copper remaining the electrolyte solution is electrodeposited by using an insoluble anode.

According to such a method, copper in the electrolyte solution recovered through the electrolytic purification step S2 is precipitated and recovered and can be separated from nickel and cobalt contained in the electrolyte solution with high separation property, and a solution with a high purity of nickel and cobalt can be obtained.

The electrolyte solution to be provided to the electrowinning (the electrolyte solution obtained after the electrolytic treatment in the electrolytic purification step S2) is used by the pH thereof being adjusted to preferably 1.5 or less and more preferably 1.0 or less. Further, the electrowinning is performed by setting the cathode current density preferably in a range of 1 $A/m^2$ or more and 2000 $A/m^2$ or less and more preferably in a range of 1 $A/m^2$ or more and 1500 $A/m^2$ or less. Further, in the treatment of electrowinning, as an insoluble anode, those of which an electrode surface is coated with a platinum-group oxide as a catalyst are generally used, but among them, types called oxygenic insoluble anodes are preferably used.

Incidentally, the electrolyte solution obtained through the electrowinning step S3 can be used as a treatment starting solution for extracting and separating nickel and cobalt as described above, but at least a part of the electrolyte solution may be repeatedly used as an electrolyte solution in the electrolytic purification step S2.

[Repeatedly Using of Electrolyte Solution: Impurity Removing Step]

Incidentally, an electrolyte solution obtained after the electrolytic treatment in the electrolytic purification step S2, or in the case of further performing the electrolytic treatment in the electrowinning step S3, an electrolyte solution obtained after the electrolytic treatment in the electrowinning step S3 is a solution in which nickel and cobalt are mainly dissolved. As described above, thereafter, the electrolyte solution containing nickel and cobalt which is obtained by separating nickel and cobalt from copper by the electrolytic treatment is subjected to a known purification treatment such as a solvent extraction treatment, so that nickel and cobalt can be recovered as solutions containing nickel and cobalt, respectively, with a high purity, or the like.

Meanwhile, at least a part of the electrolyte solution obtained through such an electrolytic treatment can be repeatedly used as the electrolyte solution of the electrolytic treatment in the electrolytic purification step S2 again. According to this, a recovery rate of copper can be increased by electrodepositing copper remaining in the electrolyte solution to the cathode by the treatment in the electrolytic purification step S2 which is repeatedly used, and separation property of copper from nickel and cobalt can be enhanced.

Herein, as described above, iron may be contained in the alloy provided to the treatment in the electrolytic purification step S2, that is, the alloy containing copper, nickel and cobalt which is obtained by melting the lithium ion battery waste in the alloy production step S1. Further, phosphorus derived from the electrolyte solution of the lithium ion battery waste may be contained. These components such as iron and phosphorus are eluted in the electrolyte solution by the electrolytic treatment in the electrolytic purification step S2 using the alloy thereof as an anode. Therefore, the electrolyte solution is a solution containing iron and phosphorus together with nickel and cobalt.

In the case of performing a treatment of subjecting such an electrolyte solution to a known purification treatment such as a solvent extraction treatment and selectively purifying nickel and cobalt, these valuable metals can be separated from components such as iron and phosphorus, which are impurity components, and can be effectively recovered. However, for example, in the case of repeatedly using some of the electrolyte solution as an electrolyte solution to be used in the electrolytic treatment in the electrolytic purification step S2, it is preferable to remove components such as iron and phosphorus, which are impurity components, as much as possible in advance. Even if a component such as phosphorus is not removed, a problem also arises in that it is difficult to efficiently use nickel and cobalt, which are selectively leached, as materials for batteries again.

In this regard, in a case where the electrolyte solution obtained through the electrolytic purification step S2 or the electrowinning step S3 is repeatedly used again, before the electrolyte solution is fed to the electrolysis tank in the electrolytic purification step S2, a treatment of removing an impurity component contained in the electrolyte solution (impurity removing step) is performed.
(Impurity Removing Step)

For example, Patent Document 1 discloses a method for separating phosphorus. Specifically, there is disclosed a method including: a step of dissolving a nickel salt, which contains a phosphorus compound and a cobalt component as impurities, with an inorganic acid to form a nickel solution containing a phosphorus compound and a cobalt component; a dephosphorization step of adding an oxidizing agent to the nickel solution to precipitate the phosphorus compound as a phosphate and removing the phosphate by solid-liquid separation; and a cobalt removal step of adding nickel oxide (Ni2O3), which is a substance different from an oxidizing agent, to the nickel solution to oxidize the cobalt component, then neutralizing and precipitating the cobalt component, and removing the cobalt component by solid-liquid separation. Further, in this method, by performing the cobalt removal step after the dephosphorization step or performing the dephosphorization step and the cobalt removal step simultaneously, after oxidation of the phosphorus compound by an oxidizing agent, oxidation of the cobalt component by nickel oxide is performed. However, as for the concentration at which phosphorus can be separated by this method, it is shown in Examples of Patent Document 1 that the concentration remains at about 5 mg/L, and it is desirable to further enhance the separation effect in order to use phosphorus in a use application for batteries.

On the other hand, in the present embodiment, specifically, at least a part of an electrolyte solution obtained after the electrolytic treatment in the electrolytic purification step S2 is recovered and an oxidizing agent and a neutralizing agent are added to the electrolyte solution such that the oxidation-reduction potential (ORP) using a silver/silver chloride electrode as a reference electrode is adjusted to 570 mV or more and the pH was adjusted in a range of 3 or more and 5 or less. In this way, by adjusting the ORP and the pH of the electrolyte solution by an oxidizing agent and a neutralizing agent, iron or phosphorus that is an impurity component contained in the electrolyte solution can be effectively separated and removed as a precipitate simultaneously or selectively. Incidentally, the separation and removal of the precipitate containing an impurity component can be performed by solid-liquid separation of an electrolyte solution obtained after the treatment using an oxidizing agent and a neutralizing agent.

Incidentally, the oxidizing agent and the neutralizing agent are not particularly limited as long as they can adjust the ORP and the pH to the above ranges, respectively. For example, as the oxidizing agent, hydrogen peroxide water, oxygen gas, ozone gas, and the like can be appropriately used.

Further, at the time of performing an oxidation treatment and a neutralization treatment by adding an oxidizing agent and a neutralizing agent, a temperature condition of room temperature or higher is preferred, but since the phosphorus concentration in an electrolyte solution obtained after the dephosphorization is increased when the temperature is higher than 60° C., the temperature is preferably 60° C. or lower.

Further, in the removal of impurities such as phosphorus, the treatment may be performed as follows. That is, first, at least a part of an electrolyte solution obtained after the electrolytic treatment in the electrolytic purification step S2 is recovered, an oxidizing agent is added thereto at a pH state in which the pH of the electrolyte solution is 1.5 or less to adjust the oxidation-reduction potential (ORP) to 570 mV or more, a neutralizing agent is then added to increase the pH to 3, and an oxidizing agent is added to adjust the ORP to 300 mV or more. In this way, by performing a two-stage oxidation treatment, iron or phosphorus that is an impurity component contained in the electrolyte solution may be formed in a precipitate simultaneously or selectively.

After these treatments are performed, an electrolyte solution obtained after the treatment using an oxidizing agent and a neutralizing agent is subjected to solid-liquid separation, and sulfuric acid is added to the obtained filtrate to adjust the pH to 1.5 or less. As described above, since a precipitate of iron or phosphorus can be produced in the electrolyte solution by the treatment using an oxidizing agent and a neutralizing agent, by subjecting the electrolyte solution containing the precipitate to a solid-liquid separation treatment, the precipitate that is a solid content is separated and removed. Then, the filtrate obtained after the solid-liquid separation is recovered and sulfuric acid is added to the filtrate, thereby obtaining a sulfuric acid solution having a pH of 1.5 or less.

The pH-adjusted filtrate is a pH-adjusted sulfuric acid solution with sulfuric acid and is a solution from which an impurity component such as iron or phosphorus is separated and removed. Therefore, by feeding a solution (filtrate) obtained by such a treatment to the electrolysis tank in the electrolytic purification step S2, the solution can be effectively used as an electrolyte solution of the electrolytic treatment without mixing iron, phosphorus, or the like.

Incidentally, the case of repeatedly using an electrolyte solution obtained after the electrolytic treatment in the electrolytic purification step S2 again has been described, but by subjecting the electrolyte solution obtained by performing the electrolytic treatment in the electrowinning step S3 after the electrolytic purification step S2 to the same treatment, a solution from which an impurity component is separated and removed (filtrate after the treatment) can be used as the electrolyte solution in an electrolytic purification step S2.

EXAMPLES

Hereinafter, the present invention will be described in more detail by means of Examples, but the present invention is not limited to the following Examples at all.

Example 1

(Alloy Production Step)

First, a lithium ion battery waste was put in a roasting furnace and roasted at a temperature of 500° C. and an electrolyte solution contained in the lithium ion battery waste was decomposed and volatilized to be removed, thereby obtaining a roasted product. Subsequently, the roasted product thus obtained was put in a furnace of a crucible made of graphite and heated to 1100° C. to be completely melted, thereby obtaining an alloy.
(Electrolytic Purification Step)

Next, the obtained alloy was casted in a plate-shaped anode. As for the anode, a portion that becomes an electrode plane was set to have a size of length 50 mm×width 50 mm and a thickness of 10 mm. Incidentally, as a result of sampling analysis for the composition of the anode, copper was 65 wt %, nickel was 15 wt %, cobalt was 15 wt %, iron was 2 wt %, and phosphorus was 1 wt %.

Meanwhile, a titanium plate having an electrode plane with the same size as that of the casted anode and having a thickness of 3 mm was used as a cathode, and one anode and one cathode were arranged to face each other in an electrolysis tank made of vinyl chloride such that a distance between the planes of the electrode plates became 20 mm. Incidentally, sides, which do not face the counterpart electrodes, of both the anode and the cathode were insulated with a masking tape.

Further, a sulfuric acid solution having a sulfuric acid concentration of 10 mass % is used as an electrolyte solution (electrolysis starting solution) and self-circulation in which the sulfuric acid solution is extracted from one end of the electrolysis tank by a pump and supplied to the other end was performed. Incidentally, the liquid temperature of the electrolyte solution was set to 30° C. (room temperature).

The electrolytic treatment was performed by using such an electrolytic apparatus by setting the anode current density to 300 A/m². As a result, the alloy used as an anode was easily dissolved, and powder-shaped copper having a purity of 99.9% or more was precipitated on the cathode.

As described above, it was possible to recovery copper, nickel and cobalt, which are valuable metals, from the lithium ion battery waste, and particularly, it was possible to separate copper from nickel and cobalt, and to recover them.

Example 2

The polarization of the anode surface was measured using the same anode and an electrolyte solution having the same composition as in Example 1 by a commercially available potentiostat according to a potential-scanning method.

As a result, it was confirmed that even when the electrolytic treatment is performed at a current density in which the anode current density is more than 3000 A/m², the anode side is not passivated.

Comparative Example 1

In Comparative Example 1, by the same method as in Example 1, a lithium ion battery waste was roasted and then a roasted material was melted, thereby obtaining an alloy.

Next, the obtained alloy was added dropwise into water while being melted to thereby obtain water-granulated shots, and the obtained water-granulated shots were further pulverized. Thereafter, the pulverized shots were introduced into a sulfuric acid solution having a sulfuric acid concentration of 20 mass %, and a method for dissolving the shots while heating the shots to a temperature of 60° C. to 70° C. was attempted. However, the whole amount thereof could not be dissolved.

Example 3

Similarly to Example 1, a lithium ion battery waste was roasted and a dry treatment of melting the obtained roasted material was performed, thereby obtaining an alloy having a composition of copper: 65 wt %, nickel: 15 wt %, cobalt: 15 wt %, iron: 2 wt %, and phosphorus: 1 wt %. Thereafter, the obtained alloy was casted in a plate-shaped anode, and the electrolytic treatment was performed by using a sulfuric acid solution having a sulfuric acid concentration of 10 mass % as an electrolyte solution. Incidentally, the anode current density was set to 300 A/m² and the liquid temperature of the electrolyte solution was set to 30° C. (room temperature).

After completion of conducting electricity, the electrolyte solution and slime adhering to the anode surface were respectively recovered and analyzed, and distribution of phosphorus was obtained. As a result, the distribution ratio of phosphorus from the alloy used as an anode to the slime was 34%. This result considerably exceeds 20% that is a target value of the distribution ratio of phosphorus to the slime, and thus elution of phosphorus contained in the alloy into the electrolyte solution was suppressed so that phosphorus could be effectively separated from nickel and cobalt.

Example 4

The electrolytic treatment was performed by using an alloy having the same composition and the same facility as in Example 3, using a sulfuric acid solution having a sulfuric acid concentration of 20 mass % as an electrolyte solution, and setting the anode current density to 2000 A/m².

As a result, the distribution ratio of phosphorus from the alloy used as an anode to the slime was 30%. This result considerably exceeds 20% that is a target value of the distribution ratio of phosphorus to the slime, and thus elution of phosphorus contained in the alloy into the electrolyte solution was suppressed so that phosphorus could be effectively separated from nickel and cobalt.

Comparative Example 2

The electrolytic treatment was performed by using an alloy having the same composition and the same facility as in Example 3, using a sulfuric acid solution having a sulfuric acid concentration of 40 mass % as an electrolyte solution, and setting the anode current density to 4000 A/m².

As a result, it was found that the distribution ratio of phosphorus from the alloy used as an anode to the slime was 5%, and 95% of phosphorus is eluted in the electrolyte solution. In this state, when nickel and cobalt eluted in the electrolyte solution were separated and recovered, it was necessary to perform a dephosphorization treatment or it was necessary to reinforce this treatment.

Example 5 •Comparative Example 3

Similarly to Example 1, a lithium ion battery waste was roasted and a dry treatment of melting the obtained roasted material was performed, thereby obtaining an alloy having the same composition as in Example 1. Thereafter, the obtained alloy was casted in a plate-shaped anode, and the electrolytic treatment was performed by using a sulfuric acid solution having a sulfuric acid concentration of 20 mass % as an electrolyte solution. Incidentally, the pH of the electrolyte solution before the electrolytic treatment (before electricity was conducted) was 0.

In this electrolytic treatment, the electricity was conducted while the cathode current density was changed in 500 A/m² to 3000 A/m². The pH of the electrolyte solution was gradually increased with electricity being conducted. Then, at the time point when the pH of the electrolyte solution reached a predetermined value, copper electrodeposited onto the cathode was recovered, the recovered copper was washed and dried, and chemical analysis was performed.

In the following Table 1, in a relation between the cathode current density and the pH of the electrolyte solution, the analysis results of copper electrodeposited onto the cathode are shown. The description "0" in Table 1 indicates that nickel was not electrodeposited and copper was electrodeposited at a high purity. In addition, the description "<0.1" indicates that very slight electrodeposition of nickel was confirmed but the nickel grade thereof was less than 0.1 wt %. Further, the descriptions "0.1" and "0.3" indicate that the nickel grades were 0.1 wt % and 0.3 wt %, respectively.

Further, the description "NG" indicates that nickel was electrodeposited so that the nickel grade was more than 0.3 wt %.

TABLE 1

| Dk | pH | | | | | |
|---|---|---|---|---|---|---|
| | 0 | 0.5 | 0.7 | 1.0 | 1.2 | 1.5 |
| 500 | ○ | ○ | ○ | ○ | <0.1 | 0.1 |
| 1000 | ○ | ○ | ○ | <0.1 | 0.1 | NG |
| 1500 | ○ | ○ | <0.1 | 0.1 | NG | NG |
| 2000 | ○ | <0.1 | 0.1 | NG | NG | NG |
| 3000 | <0.1 | 0.3 | NG | NG | NG | NG |

As shown in Table 1, it is found that there is a tendency that when the cathode current density is low and the pH of the electrolyte solution is low, the electrodeposition of nickel does not occur. However, it is found that as the pH is increased by electricity being conducted and the current density is increased, there is a tendency that nickel is started to be electrodeposited (co-deposited) along with copper.

Further, when the conditions of the cathode current density and the pH described as "<0.1" in Table 1 are plotted and shown graphically, a graph shown in FIG. 1 is obtained. Then, the linear regression equation connecting the respective points is as follows:

$$Dk = -2062 \times pH + 3002$$

That is, when the electricity is conducted at a current density higher than the cathode current density (Dk) with respect to the pH of the regression equation, it is shown that nickel is co-deposited to copper electrodeposited onto the cathode. Therefore, by controlling a current density of a limit at which nickel is not precipitated by using such an equation while measuring the pH of the electrolyte solution, high-purity copper is efficiently electrodeposited so that copper can be separated from nickel and cobalt.

Example 6

Similarly to Example 1, a lithium ion battery waste was roasted and a dry treatment of melting the obtained roasted material was performed, thereby obtaining an alloy having the same composition as in Example 1. Thereafter, the obtained alloy was casted in a plate-shaped anode, and the electrolytic treatment was performed by using a titanium plate as a cathode and a sulfuric acid solution having a sulfuric acid concentration of 20 mass % as an electrolyte solution. Incidentally, the pH of the electrolyte solution was adjusted to 1. Further, the liquid temperature of the electrolyte solution was set to 30° C. (room temperature).

When electricity was conducted by setting the cathode current density to 1500 A/m$^2$, the alloy of the anode was easily dissolved. Further, copper was electrodeposited onto the cathode, the electrodeposited copper was analyzed, and as a result, the copper grade was 99.9 wt % or more.

Next, by adding an aqueous solution of hydrogen peroxide to an electrolyte solution obtained after the electrolytic treatment (electrolyte solution obtained after separating and recovering copper), the oxidation-reduction potential (ORP) of the electrolyte solution was adjusted to 570 mV at a potential using a silver/silver chloride electrode as a reference electrode, and the pH was adjusted to 4 by adding sodium hydroxide. Then, an electrolyte solution obtained after adjusting the ORP and the pH was subjected to solid-liquid separation and the obtained filtrate was chemically analyzed.

As a result, the iron concentration in the filtrate was 2 mg/L or less, and the phosphorus concentration could also be decreased to 1 mg/L.

Comparative Example 4

In Comparative Example 4, the treatment was performed in the same manner as in Example 6, except that the pH of an electrolyte solution obtained after the electrolytic treatment was adjusted to 2, and the filtrate obtained by solid-liquid separation was chemically analyzed.

As a result, the iron concentration in the filtrate was 2000 mg/L, the phosphorus concentration was 500 mg/L, and iron or phosphorus was contained at a concentration considerably higher than that in Example 6. In this way, in Comparative Example 4, phosphorus in the electrolyte solution could not be decreased to 5 mg/L or less, which is a target value.

Example 7

The electrolytic treatment was performed by using an alloy having the same composition as in Example 1 as an anode under the same condition to dissolve the alloy and electrodeposit copper onto the cathode. As for the electrolyte solution (electrolytically-eluted solution) from which copper is separated and recovered after the electrolytic treatment, the Ni concentration was 20 g/L, the Co concentration was 20 g/L, the Cu concentration was 10 g/L. Further, the pH of the electrolytically-eluted solution was 1.

Next, the electrowinning treatment was performed by using the obtained electrolytically-eluted solution as an electrolysis starting solution. Specifically, the electrowinning treatment was performed using, as an anode, an oxygenic insoluble anode of which an electrode surface is coated with a platinum-group oxide as a catalyst, using a titanium plate as a cathode, and setting a cathode current density to 1500 A/m$^2$. This electrolytic treatment was performed until the copper concentration of the electrolyte solution was decreased to 1 g/L, electricity was then cut, and copper electrodeposited to the cathode was recovered and analyzed.

As a result, the grade of copper electrodeposited to the cathode was 99.9 wt %. Further, an electrolysis final solution obtained after separating and recovering copper was analyzed, and as a result, it was found that there was no variation in concentrations of nickel and cobalt before and after the electrolysis, and also from this point, the co-deposition of nickel and cobalt did not occur.

Example 8

After the electrowinning treatment performed in Example 7, the cathode current density was set to 300 A/m$^2$, and subsequently, electrowinning was continued until the copper concentration of the electrolyte solution became 0.5 g/L.

As a result, the grade of copper electrodeposited to the cathode was 99.0 wt %. Further, an electrolysis final solution obtained after separating and recovering copper was analyzed, and as a result, it was found that there was no variation in concentrations of nickel and cobalt before and after the electrolysis, and also from this point, the co-deposition of nickel and cobalt did not occur.

Comparative Example 5

The treatment was performed in the same manner as in Example 7, except that the pH of the electrolytically-eluted solution was adjusted to 3 and the electrowinning treatment was performed by using the pH-adjusted solution as an electrolysis starting solution under the condition in which the cathode current density was set to 3000 A/m$^2$.

As a result, the copper grade of the electrodeposit electrodeposited onto the cathode was 82 wt %, the co-deposition of nickel was confirmed, and copper could not be separated and recovered in a state of having a high purity. Further, an electrolysis final solution obtained after separating and recovering copper was analyzed, and as a result, it was found that there was a variation in concentration of nickel before and after the electrolysis, and also from this point, the co-deposition of nickel was confirmed.

In the following Table 2, the electrowinning conditions in Examples 7 and 8 and Comparative Example 5 and the measurement results of the concentrations of respective components of the electrolysis starting solution and the electrolysis final solution are shown.

TABLE 2

|  | pH | Dk (A/m$^2$) | Electrolysis starting solution (g/L) | | | Electrolysis final solution (g/L) | | | Electrodeposit grade (wt %) | | |
| --- | --- | --- | --- | --- | --- | --- | --- | --- | --- | --- | --- |
|  |  |  | Ni | Co | Cu | Ni | Co | Cu | Ni | Co | Cu |
| Example 7 | 1 | 1500 | 20 | 20 | 10 | 20 | 20 | 1 | 0 | 0 | 99.9 |
| Example 8 | 1 | 300 | 20 | 20 | 1 | 20 | 20 | 0.5 | 0 | 0 | 99.0 |
| Comparative Example 5 | 3 | 3000 | 20 | 20 | 10 | 18 | 20 | 1 | 18 | 0 | 82.0 |

The invention claimed is:

1. A method for treating a lithium ion battery waste, the method comprising:
   an alloy production step of introducing the lithium ion battery waste into a furnace and then melting the lithium ion battery waste by heating, thereby producing an alloy containing copper, nickel and cobalt; and
   an electrolytic purification step of subjecting the alloy to such an electrolytic treatment that the alloy is charged as an anode into a sulfuric acid solution and then electricity is conducted between the anode and a cathode to electrodeposit copper contained in the alloy onto the cathode, thereby separating copper from nickel and cobalt,
   wherein in the electrolytic purification step, the electrolytic treatment is performed while a pH of an electrolyte solution is controlled to be 0 or more and 1.2 or less and a current density (Dk) of the cathode is controlled to be equal to or less than a current density calculated by the following Equation 1:

$$Dk\ (A/m^2) = -2062 \times pH + 3002 \quad \text{(Equation 1)}.$$

2. The method for treating a lithium ion battery waste according to claim 1, wherein in the electrolytic purification step, a current density of the anode is set in a range of 3 A/m$^2$ or more and 3000 A/m$^2$ or less.

3. The method for treating a lithium ion battery waste according to claim 2, wherein in the electrolytic purification step, the electrolytic treatment is performed while a copper concentration in the sulfuric acid solution that is the electrolyte solution is maintained in a range of 5 g/L or more and 50 g/L or less.

4. The method for treating a lithium ion battery waste according to claim 3, wherein the alloy contains phosphorus in a range of 0.5 wt % or more and 2.0 wt % or less, and the alloy is used as an anode in the electrolytic purification.

5. The method for treating a lithium ion battery waste according to claim 3, further comprising an electrowinning step of supplying the electrolyte solution obtained after the electrolytic treatment in the electrolytic purification step to an electrolysis tank and electrodepositing copper remaining in the electrolyte solution by using an insoluble anode.

6. The method for treating a lithium ion battery waste according to claim 2, wherein the alloy contains phosphorus in a range of 0.5 wt % or more and 2.0 wt % or less, and the alloy is used as an anode in the electrolytic purification.

7. The method for treating a lithium ion battery waste according to claim 6, further comprising an electrowinning step of supplying the electrolyte solution obtained after the electrolytic treatment in the electrolytic purification step to an electrolysis tank and electrodepositing copper remaining in the electrolyte solution by using an insoluble anode.

8. The method for treating a lithium ion battery waste according to claim 2, further comprising an electrowinning step of supplying the electrolyte solution obtained after the electrolytic treatment in the electrolytic purification step to an electrolysis tank and electrodepositing copper remaining in the electrolyte solution by using an insoluble anode.

9. The method for treating a lithium ion battery waste according to claim 8, wherein the electrolyte solution obtained through the electrowinning step and discharged from the electrolysis tank is repeatedly supplied as the electrolyte solution to be used in the electrolytic purification step.

10. The method for treating a lithium ion battery waste according to claim 1, wherein in the electrolytic purification step, the electrolytic treatment is performed while a copper concentration in the sulfuric acid solution that is the electrolyte solution is maintained in a range of 5 g/L or more and 50 g/L or less.

11. The method for treating a lithium ion battery waste according to claim 10, wherein the alloy contains phosphorus in a range of 0.5 wt % or more and 2.0 wt % or less, and the alloy is used as an anode in the electrolytic purification.

12. The method for treating a lithium ion battery waste according to claim 10, further comprising an electrowinning step of supplying the electrolyte solution obtained after the electrolytic treatment in the electrolytic purification step to an electrolysis tank and electrodepositing copper remaining in the electrolyte solution by using an insoluble anode.

13. The method for treating a lithium ion battery waste according to claim 12, wherein the electrolyte solution obtained through the electrowinning step and discharged from the electrolysis tank is repeatedly supplied as the electrolyte solution to be used in the electrolytic purification step.

14. The method for treating a lithium ion battery waste according to claim 1, wherein the alloy contains phosphorus in a range of 0.5 wt % or more and 2.0 wt % or less, and the alloy is used as an anode in the electrolytic purification.

15. The method for treating a lithium ion battery waste according to claim 14, further comprising an electrowinning step of supplying the electrolyte solution obtained after the electrolytic treatment in the electrolytic purification step to an electrolysis tank and electrodepositing copper remaining in the electrolyte solution by using an insoluble anode.

16. The method for treating a lithium ion battery waste according to claim 15, wherein the electrolyte solution obtained through the electrowinning step and discharged from the electrolysis tank is repeatedly supplied as the electrolyte solution to be used in the electrolytic purification step.

17. The method for treating a lithium ion battery waste according to claim 1, further comprising an electrowinning step of supplying the electrolyte solution obtained after the electrolytic treatment in the electrolytic purification step to an electrolysis tank and electrodepositing copper remaining in the electrolyte solution by using an insoluble anode.

18. The method for treating a lithium ion battery waste according to claim 17, wherein the electrolyte solution obtained through the electrowinning step and discharged from the electrolysis tank is repeatedly supplied as the electrolyte solution to be used in the electrolytic purification step.

19. The method for treating a lithium ion battery waste according to claim 1, further comprising an impurity removing step of removing an impurity component by recovering at least a part of an electrolyte solution obtained after the electrolytic treatment in the electrolytic purification step and adding an oxidizing agent and a neutralizing agent to the electrolyte solution to adjust an oxidation-reduction potential (reference electrode: silver/silver chloride electrode) to 570 mV or more and to adjust a pH in a range of 3 or more and 5 or less,
  wherein after the impurity removing step, sulfuric acid is added to a filtrate obtained by solid-liquid separation to adjust the pH to 1.5 or less, and the pH-adjusted filtrate is repeatedly supplied as the electrolyte solution to be used in the electrolytic purification step.

20. The method for treating a lithium ion battery waste according to claim 1, further comprising an impurity removing step of removing an impurity component by recovering at least a part of an electrolyte solution obtained after the electrolytic treatment in the electrolytic purification step, adding an oxidizing agent to the electrolyte solution at a stage in which a pH of the electrolyte solution is 1.5 or less to adjust an oxidation-reduction potential (reference electrode: silver/silver chloride electrode) to 570 mV or more, and then further adding an oxidizing agent and a neutralizing agent to increase the pH to 3 and to adjust the oxidation-reduction potential to 300 mV or more,
  wherein after the impurity removing step, sulfuric acid is added to a filtrate obtained by solid-liquid separation to adjust the pH to 1.5 or less, and the pH-adjusted filtrate is repeatedly supplied as the electrolyte solution to be used in the electrolytic purification step.

\* \* \* \* \*